United States Patent
Hupp et al.

(10) Patent No.: US 7,182,116 B2
(45) Date of Patent: Feb. 27, 2007

(54) DEVICE FOR JOINING SUBSTRATES

(75) Inventors: Alexander Hupp, Sulzfeld (DE);
Ulrich Speer, Eisingen (DE); Roland Wagner, Bretten (DE); Frank Michels, Knittlingen (DE)

(73) Assignee: Steag HamaTech AG (DE)

( * ) Notice: Subject to any disclaimer, the term of this patent is extended or adjusted under 35 U.S.C. 154(b) by 92 days.

(21) Appl. No.: 10/472,676

(22) PCT Filed: Mar. 1, 2002

(86) PCT No.: PCT/EP02/02213

§ 371 (c)(1),
(2), (4) Date: Sep. 18, 2003

(87) PCT Pub. No.: WO02/077985

PCT Pub. Date: Oct. 3, 2002

(65) Prior Publication Data
US 2004/0094271 A1    May 20, 2004

(30) Foreign Application Priority Data
Mar. 21, 2001  (DE) .............................. 101 13 833

(51) Int. Cl.
*B32B 37/00*   (2006.01)
(52) U.S. Cl. ........................................ 156/391; 156/580
(58) Field of Classification Search .................. 156/74, 156/295, 391, 580, 581, 583.1, 583.3; 264/1.33, 264/106, 107; 425/810
See application file for complete search history.

(56) References Cited

U.S. PATENT DOCUMENTS 2,423,965 A   7/1947  Coyle
4,768,185 A * 8/1988  Camerik ..................... 720/710
4,877,475 A  10/1989  Uchida et al.
5,888,433 A * 3/1999  Amo ......................... 264/1.33

FOREIGN PATENT DOCUMENTS

| DE | 19715779 | 10/1998 |
| DE | 19801456 | 7/1999 |
| DE | 20019557 | 4/2001 |

(Continued)

OTHER PUBLICATIONS

JP 62124629, Patent Abstracts of Japan.

(Continued)

*Primary Examiner*—James Sells
(74) *Attorney, Agent, or Firm*—Robert W Becker & Associates; Robert W Becker

(57) ABSTRACT

An apparatus is provided for joining together substrates, which have an inner hole, to form a substrate disk. An expandable element is introducible into the inner hole of at least two superimposed substrates. The element is expandable to such an extent that it can come into contact with the inner holes of both of the substrates to close off an intermediate space formed between the substrates relative to the environment. A substrate support is rotatable about an axis of rotation perpendicular to a support surface thereof. A centering device is rotatably coupled with the substrate support and is movable relative thereto in the direction of the axis of rotation. The expandable element is disposed, and is compressible, between the substrate support and the centering device.

10 Claims, 2 Drawing Sheets

| | FOREIGN PATENT DOCUMENTS | | |
|---|---|---|---|
| EP | 0833315 | | 4/1998 |
| EP | 1120781 | | 8/2001 |
| EP | 1 172812 | | 1/2002 |
| JP | 62124629 | * | 6/1987 |
| JP | 01011038 | * | 1/1989 |
| WO | WO 00/76752 | | 12/2000 |

OTHER PUBLICATIONS

JP 63146265, Patent Abstracts of Japan.
JP 11273165, Patent Abstracts of Japan.
JP 01011038, Patent Abstracts of Japan.

* cited by examiner

DEVICE FOR JOINING SUBSTRATES

BACKGROUND OF THE INVENTION

The present invention relates to an apparatus for joining together substrates, which have an inner hole, to form a substrate disk, and includes an expandable element that can be introduced into the inner hole of at least two superimposed substrates.

Such an apparatus for the joining together of disks to form a CD or DVD is known, for example, from U.S. Pat. No. 4,877,875. With this known apparatus, a centering pin is provided that prior to the joining together of the substrates is introduced into the respective inner hole of the substrates in order to center them relative to one another. During the joining together, the substrates are rotated in order to uniformly distribute an adhesive material that is disposed between them. To prevent a slippage between the substrates, which would adversely affect the joining-together process, the substrates must be rotated synchronously. With the known apparatus this is achieved via a frictional connection between the substrates, in that the substrates are pressed so strongly against one another that they rotate in common.

As a result of this pressing together of the substrates, however, there results the problem that the substrates must already be brought into contact prior to a uniform distribution of the adhesive between them, which adversely affects the distribution of the adhesive. Furthermore, all mechanical components of the apparatus must have such a strong design that they can resist the mechanical loading during the pressing together, which leads to high costs for the apparatus. Furthermore, there is the danger that air penetrates via the respective inner holes into the gap formed between the substrates, as a result of which bubbles can result on the inner edge of the adhesive.

From EP 0 833 315 A an apparatus of the aforementioned type is furthermore known.

Proceeding from the known apparatus, it is an object of the present invention to provide an apparatus for the joining together of substrates, which have an inner hole, to form a substrate disk, with such apparatus ensuring in a straightforward and economical manner a simultaneous rotation of both substrates during the adhesion process.

SUMMARY OF THE INVENTION

Pursuant to the invention, this object is realized for an apparatus of the aforementioned type in that the element that is introducible into the inner hole of the substrate is expandable to such an extent that it comes into contact with the inner holes of both substrates and seals or closes off an intermediate space formed between the substrates relative to the environment. By expanding the element, it comes into contact with the inner holes of the substrates and enables a simultaneous transmission of a rotational movement of the element to both substrates, so that they are rotated synchronously relative to one another. The substrates are secured against slippage, so that a proper joining together of the substrates is ensured. At the same time, the intermediate space that is formed between the substrates is closed off relative to the inner hole, thereby preventing air from entering into this region. This prevents centrifuging effects of the adhesive that is disposed between the substrates, and also prevents bubbles on the inner edge of the adhesive.

Pursuant to a particularly preferred embodiment of the invention, the element is made of an elastic material so that it can be repeatedly used, and to be able to adapt to the inner periphery of the inner holes of the substrates. The element is preferably expandable by the application of pressure.

Pursuant to a preferred embodiment of the invention, the element is compressible between two parts that are movable relative to one another in order to achieve a radial expansion of the element in contact with the inner periphery of the inner holes of the substrates. In this connection, one part is preferably a substrate support that is rotatable about an axis perpendicular to the support surface. The rotatable substrate support, upon which one of the two substrates rests, reduces the forces that are transmitted by the element for rotation of the substrates, since a transmission of force to the rotational movement is also effected via the support surface. The other part is preferably a centering pin that is rotatably coupled with the support and is movable relative to the support in the direction of the axis of rotation in order to be able to compress the expandable element.

Pursuant to a preferred embodiment of the invention, the element is an elastic ring that is radially expandable for closing off an intermediate space between the substrates. To ensure a good radial expansion of the element, at least one of the parts preferably has a conically widening portion that for expansion of the ring is introducible into a central hole thereof. The centering pin preferably extends through a central hole of the ring in order to fix the ring and enable a coupling of the centering pin with the support.

Pursuant to an alternative embodiment of the invention, the element is an elastic chamber that can be supplied with pressure in order to enable a pneumatic or hydraulic expansion of the element. Pursuant to one embodiment of the invention, the chamber wall has a smaller outer periphery than the inner periphery of the inner hole of the substrate when the chamber pressure is at ambient pressure. By applying a pressure medium, the chamber can be expanded when the element is disposed in the inner holes of the substrates. Pursuant to an alternative embodiment, the chamber wall has a larger outer periphery than the inner periphery of the inner hole of the substrates when the chamber pressure is at ambient pressure. To introduce the element into the inner hole of the substrate, the chamber is first supplied with an underpressure in order to contract it. The advantage of this embodiment is that a vacuum source is used that, for example, can also be used for holding the substrate upon the rotatable support. An additional element for applying a positive pressure can be eliminated.

Pursuant to one particularly preferred embodiment of the invention, the element is fixedly connected with a rotatable substrate support in order to achieve a synchronous rotation of the element and the substrate support, as well as of the substrates.

The invention is particularly suitable for the manufacture of optical data carriers such as, for example, CDs, DVDs, DVRs, etc.

BRIEF DESCRIPTION OF THE DRAWINGS

The invention will be explained subsequently with the aid of preferred embodiments with reference to the drawings; the drawings show.

DESCRIPTION OF THE PREFERRED EMBODIMENTS

Figure 1:
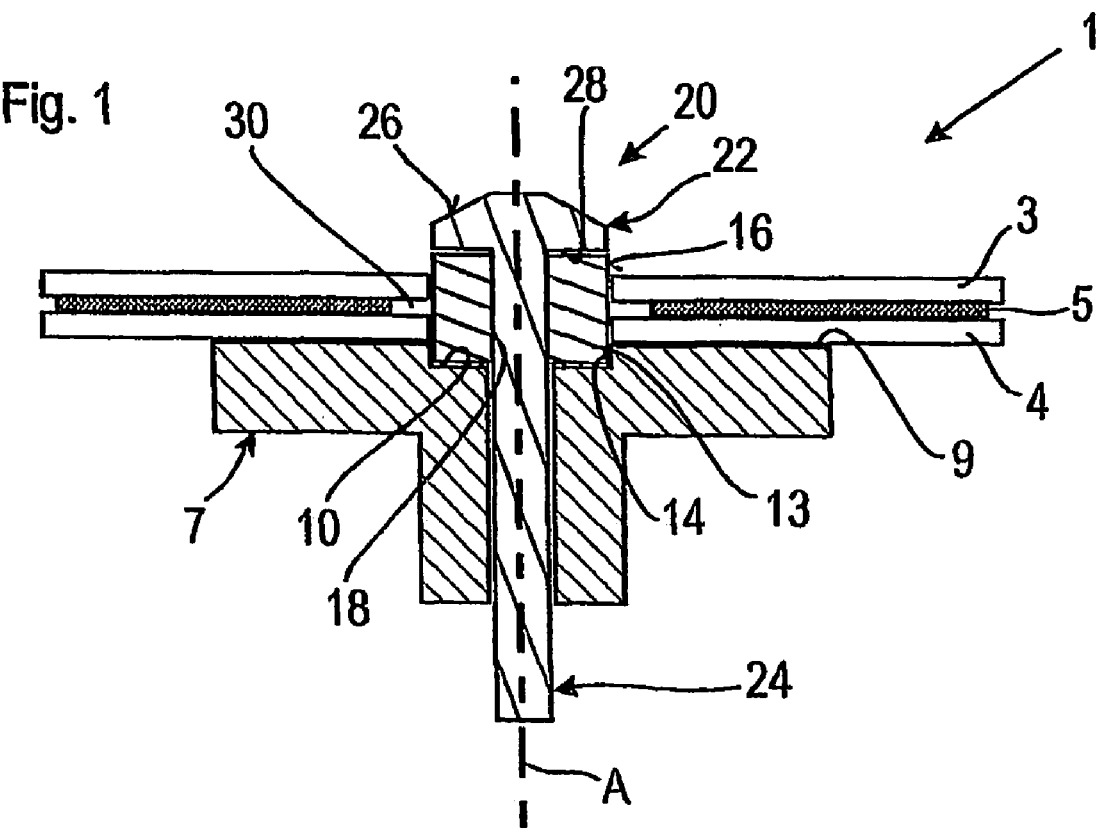
FIG. 1 a schematic cross-sectional view of an inventive apparatus in a receiving position.

FIG. 1 shows a schematic cross-sectional view of an apparatus 1 for joining together substrates 3,4, which each have an inner hole. In the fig., illustrated between the substrates 3,4 is an adhesive layer 5, which, as will be described in greater detail subsequently, is uniformly distributed between the substrates 3,4 by rotating them.

The apparatus 1 has a support 7 that is rotatable about the axis A via a non-illustrated drive mechanism. The support 7 has a support surface 9 upon which the substrate 4 rests. Although the support 7 in FIG. 1 is illustrated such that it has smaller peripheral dimensions than does the substrate 4, the support 7 can also have the same or larger peripheral dimensions than does the substrate 4, so that the substrate 4 rests completely upon the support surface 9. The support surface 9 can be provided with vacuum openings for drawing the substrate 4 against the substrate surface in order to hold the substrate securely on the support 7. Alternatively, the support 7 could also be embodied as a ring element having a vacuum ring upon which the substrate 4 rests and is securely held.

Formed in the support surface 9 is a recess 10 that has a peripheral shape that corresponds to the inner hole of the substrates 3, 4. Received in the recess 10 is an elastic element 13 that is radially guided by a shoulder 14 of the recess 10.

The elastic element 13 has a peripheral surface 16, the peripheral shape of which corresponds to the shape of the inner hole of the substrates 3,4. The elastic element 13 has a central opening 18 that is centered relative to the axis of rotation A of the support 7.

The apparatus 1 is furthermore provided with a centering pin 20 having a head portion 22 and a shaft portion 24. The shaft portion 24 extends through the central opening 18 of the elastic element 13, and is rotatably coupled with the support 7, for example via a splined connection, in order to be rotated about the axis A in common with the support 7. The centering pin 20 is displaceably held relative to the support 7 in the direction of the axis of rotation A.

The head 22 of the centering pin 20 is disposed on that side of the elastic element 13 that is opposite the support 7, so that the elastic element 13 is received between the support 7 and the head 22. The head 22 of the centering pin 20 has a centering inclination or bevel 26, which faces away from the support 7, as well as a pressure surface 28, which faces the support 7 and extends essentially parallel to the support surface 9, and which, as will be described subsequently, is used for compressing the elastic element 13.

The function of the apparatus 1 will now be explained in greater detail with reference to FIGS. 1 and 2.

For loading and unloading the apparatus 1, the support 7 and the centering pin 20 are positioned relative to one another in the direction of the axis of rotation A in such a way that the elastic element 13 is not compressed between the head 22 or the centering pin 20 and the support 7, as illustrated in FIG. 1. As can be recognized in FIG. 1, the pressure surface 28 of the head 22 of the centering pin 20 is slightly spaced from the elastic element 13. In this position, the substrate 4 is first placed upon the support 7, whereby the substrate 4 is centered relative to the centering pin 20 and the axis of rotation A by the centering inclination or bevel 26 of the centering pin 20. An adhesive 5 is now applied to the substrate 4. Subsequently, the substrate 3 is placed upon the substrate 4, so that essentially the condition shown in FIG. 1 is achieved.

Instead of applying the adhesive 5 to the substrate 4 after its placement upon the support 7, the adhesive could, of course, also be previously applied to upon the substrate 4 or could be applied to the substrate 3. The adhesive 5 is applied in such a way that it is spaced from the inner holes of the substrates 3,4. In this way, there is formed a free space 30 in the region of the inner holes of the substrates 3,4 when the substrates 3,4 are disposed on one another, as shown in FIG. 1.

The centering pin 20 is now moved toward the support 7 in the direction of the axis of rotation A. The pressure surface 28 of the head 22 of the centering pin 20 comes into contact with the elastic element 13 and presses it firmly against the support 7. Upon a further movement of the centering pin 20, the elastic element 13 is compressed between the head 22 of the centering pin 20 and the support 7, and as a result expands or bulges radially. The peripheral surface 16 of the elastic element 13 conforms firmly to the inner holes of the substrates 3,4 and thereby seals the space 30 between the substrates 3,4 relative to the environment. The support 7 is now rotated about the axis of rotation A via the non-illustrated drive means. Since the centering pin 20 is rotatably coupled with the support 7, the centering pin 20 is also rotated about the axis A. Since the elastic element 13 is fixedly clamped between the centering pin 20 and the support 7, the elastic element 13 is also rotated about the axis of rotation A. Since the peripheral surface 16 of the elastic element 13 is conformed to the inner holes of the substrates 3,4, the rotational movement is also transmitted to the substrate 3,4. The rotational movement of the support 7 is, of course, also transmitted directly to the substrate 4 via the support surface 9.

Due to the rotation, the adhesive 5 is uniformly distributed between the substrates 3,4. Since the space 30 is sealed relative to the environment by the elastic element 13, air is prevented from entering between the substrates 3,4 via the inner holes of the substrates. This prevents centrifuging effects of the adhesive 5, and furthermore a formation of bubbles due to entry of air into the space 30 is prevented.

To remove the substrates 3,4, which are glued together to form a substrate disk, the centering pin is again moved into the position shown in FIG. 1. Due to the elasticity of the element 13, it also moves into the position shown in FIG. 1, so that the substrate disk now rests freely upon the support surface 9 and can be removed.

Figure 3:
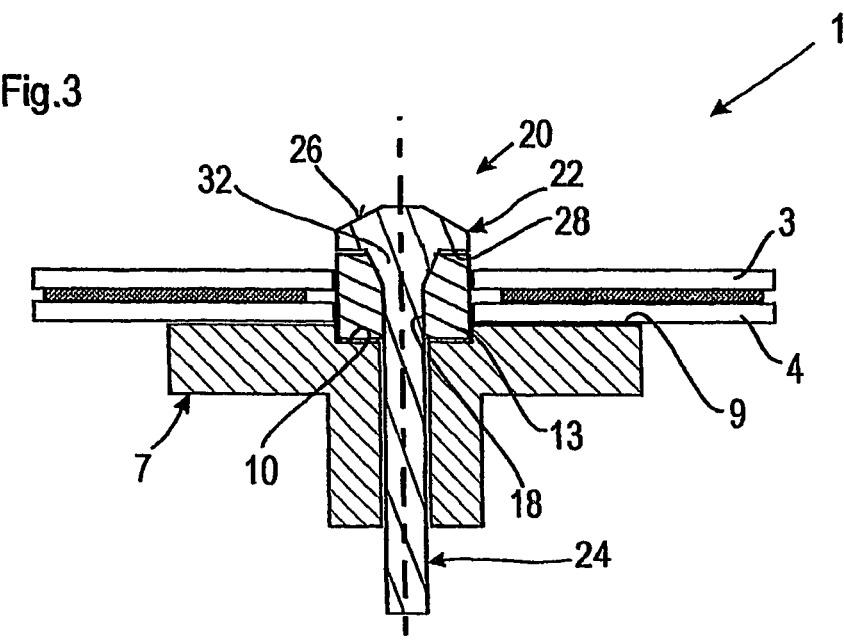
FIG. 3 a schematic cross-sectional view of an apparatus of the present invention pursuant to a second embodiment.

FIG. 3 shows an alternative embodiment of an apparatus 1 for joining substrates 3,4 together. With the embodiment illustrated in FIG. 3, the same reference numerals are used to the extent that they designate the same or similar elements.

Figure 2:
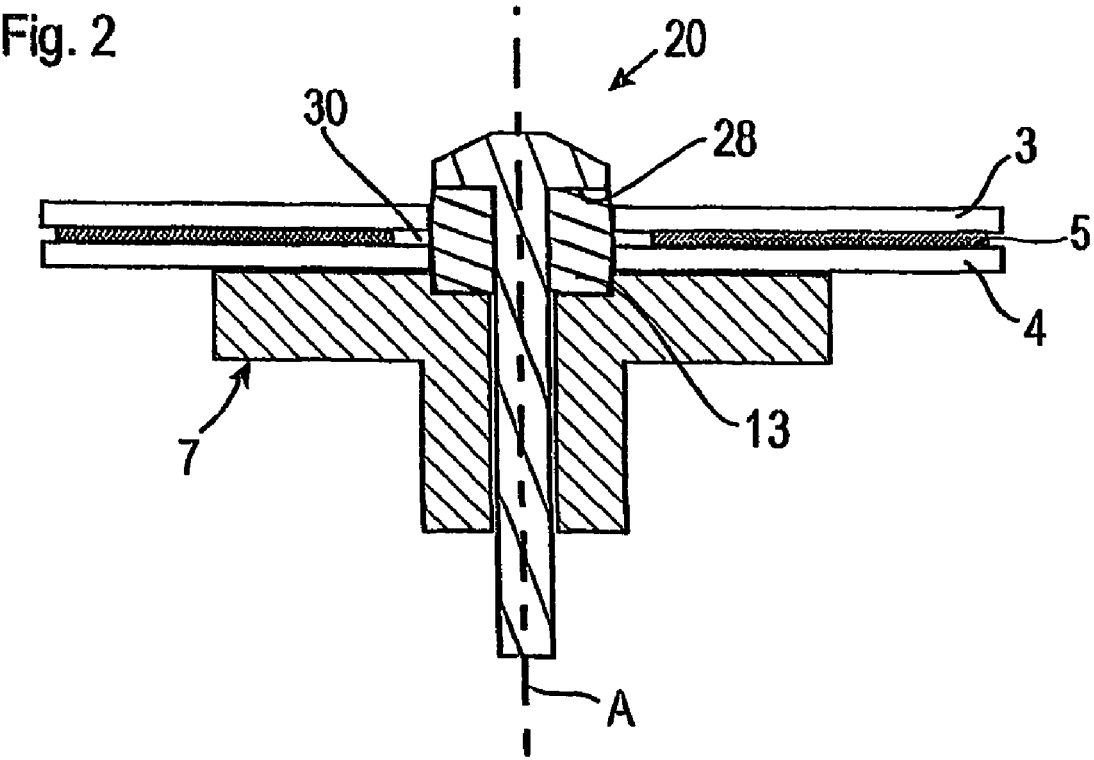
FIG. 2 a schematic cross-sectional view of the apparatus of FIG. 1 in a holding position.

The apparatus 1 of FIG. 3 is essentially the same as the apparatus 1 of FIGS. 1 and 2. The apparatus 1 has a support 7 with a support surface 9 and a recess 10. Received in the recess 10 is an elastic element 13. The elastic element 13 has a central opening 18 through which extends a shaft portion 24 of a centering pin 20. The centering pin 20 is rotatably coupled with the support 7. The centering pin 20 has a centering inclination or bevel 26 that faces away from the support surface 9, and also has a pressure surface 28 that faces the support surface 9 and extends essentially parallel thereto. The shaft portion 24 has, adjacent to the head 22 of the centering pin 20, a conically widening portion 32 that is received in the inner hole 18 of the elastic element 13.

With a movement of the centering pin 20 directed in the direction of the support 7, the conically widening portion 32 effects a particularly good expansion of the elastic element 13.

The function of the apparatus 1 of FIG. 3 essentially corresponds to the function of the apparatus of FIGS. 1 and 2 and will therefore not be explained again.

Figure 4:
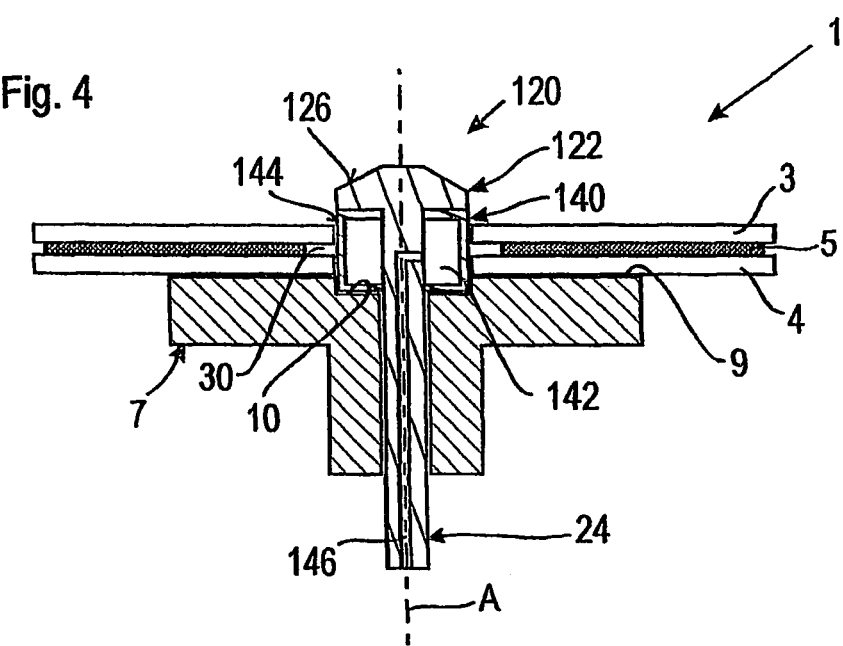
FIG. 4 a schematic cross-sectional view of an apparatus of the present invention pursuant to a third embodiment.

FIG. 4 shows a further embodiment of the present invention. In the embodiment of FIG. 4 the same reference numerals will be used as in FIGS. 1 and 2 to the extent that similar or identical components are identified.

FIG. 4 shows an apparatus 1 for joining together substrates 3,4 that are glued together by an adhesive 5 disposed between the substrates 3,4. The apparatus 1 is provided with a support 7 having a support surface 9 upon which a substrate 4 can rest. The support 7 has a recess 10 in the support surface 9. The support 7 is coupled with a non-illustrated drive mechanism in order to rotate the support 7 about an axis of rotation A. The apparatus 1 is furthermore provided with a centering pin 120 that has a head portion 122 and a shaft portion 124. The head portion 122 has a centering inclination or bevel 126 that faces away from the support 7.

The shaft portion 124 of the centering pin 120 extends through the support 7 and is rotatably coupled therewith, so that it rotates with the support 7 when the latter is rotated about the axis of rotation A. The centering pin is centered relative to the axis of rotation A.

Provided on the underside of the head portion 122 of the centering pin 120 is an elastic chamber element 140 that forms a sealed annular chamber 142 about a portion of the shaft 124. The chamber element 140 has an elastic peripheral wall 144, the peripheral shape of which essentially corresponds to the peripheral shape of the inner hole of the substrates 3,4. The chamber element 140 is disposed on the centering pin 120 in any suitable manner, and is, for example, fused or welded to the head portion 122 as well as to the shaft portion 124 in order to form the sealed chamber 142. In this way, the chamber element 140 is also fixedly connected with the centering pin 120.

The shaft portion 124 of the centering pin 120 has a conduit 146 that opens into the sealed chamber 142. The conduit 146 is in communication with a non-illustrated pump via which the sealed chamber 142 can be supplied with a fluid such as, for example, air, which leads to an elastic expansion of the chamber element 140.

The function of the apparatus of FIG. 4 will be described in detail subsequently.

To begin with, the sealed chamber 142 is at ambient pressure, and hence the chamber element 140 is in the position shown in FIG. 4. The substrates 3,4 are brought into the position illustrated in FIG. 4 in the manner already described above. The sealed chamber 142 is now supplied with compressed air, so that the chamber element 140 expands radially. The peripheral wall 144 conforms firmly to the inner periphery of the inner holes of the substrates 3,4 and seals a space 30 formed between the substrates. The support 7 is now rotated about the axis of rotation A, as a result of which also the centering pin 120 and the chamber element 140 are rotated about the axis of rotation A. Due to the tight contact between the peripheral wall 144 of the chamber element 140, and the inner periphery of the inner holes of the substrates 3,4, the substrates 3,4 are also rotated about the axis of rotation A. The rotational movement of the support 7 is, of course, also transmitted via the support surface 9 to the substrate 4 and via the adhesive 5 to the substrate 3. The adhesive 5 is uniformly distributed between the substrates 3,4, which in this manner are glued together.

After the gluing, the chamber 142 is vented, so that the peripheral wall 144 is again moved away from the inner holes of the substrates 3,4, so that the glued substrates are released for removal.

With the embodiment described with reference to FIG. 4 the chamber 142 was supplied with pressure fluid in order to radially expand the peripheral wall 144. Alternatively, however, it would also be possible for the chamber element 140 to have a peripheral wall 144 that, when the chamber 142 is at ambient pressure, presses firmly against the inner periphery of the inner holes of the substrates. In order to enable a loading and unloading of the substrates 3,4, the chamber 142 is provided with an underpressure in order to contract the chamber. For the application of the underpressure, it is possible, for example, to use a vacuum pump that is also in communication with vacuum openings in the support surface 9.

Figure 5:
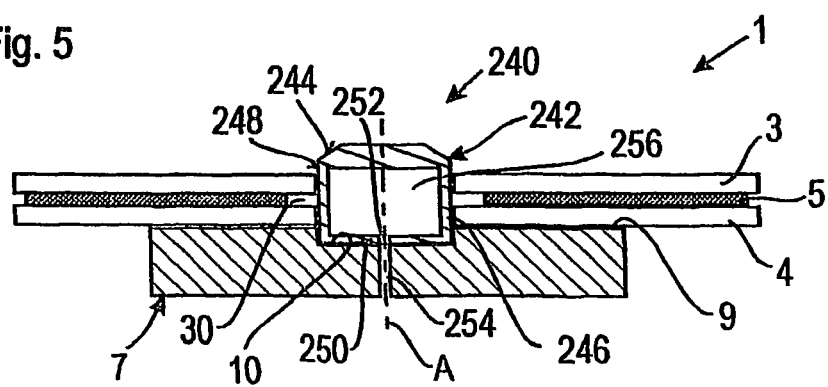
FIG. 5 a schematic cross-sectional view of an apparatus of the present invention pursuant to a fourth embodiment.

FIG. 5 shows a further alternative embodiment of the invention. In FIG. 5, the same reference numerals are used as in FIG. 1 to the extent that similar or identical elements are indicated.

FIG. 5 shows an apparatus 1 for the joining together of substrates 3,4 that are glued with an adhesive 5 that is disposed between them.

The apparatus 1 is provided with a support 7 that is connected in a suitable manner with a non-illustrated drive means in order to rotate the support 7 about an axis of rotation A. The support 7 has a support surface 9 in which is formed a recess 10.

Disposed in the recess 10 is an elastic chamber element 240 that is fixedly connected with the support 7 in any suitable manner. The elastic chamber element 240 is provided with a rigid upper portion 242 having a centering inclination or bevel 244. The chamber element 240 has an elastically expandable peripheral wall 246 that has a peripheral surface 248. The shape of the peripheral surface 248 essentially corresponds to the shape of the inner holes of the substrate 3,4. A base wall 250 of the chamber element 240 has an opening 252 that communicates with a conduit 254 in the support 7. The conduit 254 is in communication with a pump in order to supply a pressure fluid to a chamber 256 of the chamber element 240.

The function of the apparatus 1 of FIG. 5 will now be explained in the following. The chamber 256 is at ambient pressure, so that the chamber element 240 is in the position shown in FIG. 5. The substrates 3,4 are loaded in the manner already described above, whereby the centering bevel 244 of the chamber element 240 serves for centering the substrates 3,4. As soon as the substrates are loaded, the chamber 256 is supplied with a pressure fluid such as, for example, air, so that the peripheral wall 246 expands radially outwardly. The peripheral surface 248 of the wall 246 conforms tightly against the peripheral surfaces of the inner holes of the substrates 3,4 and seals a space 30 formed between the substrates 3,4. The support 7 is now rotated about the axis of rotation A, as a result of which the chamber element 240, which is fixedly connected with the support 7, is also rotated. The rotational movement is also transmitted via the chamber element 240 to the substrates 3,4, so that the adhesive 5 that is disposed between them is uniformly distributed and the substrates 3,4 are glued together. After the gluing of the substrates 3,4, the pressure fluid is withdrawn from the chamber 256, so that the peripheral wall 246 is again moved back into the position shown in FIG. 5. The substrates 3,4 can now be removed as a substrate disk.

To ensure a radial expansion of a peripheral wall 246, ribs or straps can be provided in the interior of the chamber 256 that connect the rigid upper portion 242 with the support 7 and prevent a movement of the rigid upper portion 242 relative to the support 7. The chamber element 240 can also be brought into the position shown in FIG. 5 by applying an underpressure, and can be radially expanded by venting, as was described above with reference to the embodiment of FIG. 4.

The invention was previously described with the aid of preferred embodiments of the invention without, however, being limited to the concretely described embodiments. For example, the elastic element of FIGS. 1 to 3 can be fixedly coupled with the support and/or the centering pin in any suitable manner. Instead of providing a centering pin that extends through the elastic element, a separate element could also be provided that presses against a surface of the elastic element that faces away from the support in order to compress and radially expand the element. Such an element need not be rotatably coupled with the support. The elements described with reference to one embodiment can also be used in the other embodiments to the extent that compatibility is provided.

The specification incorporates by reference the disclosure of German priority document 13 833.4 filed Mar. 21, 2001 and PCT/EP02/02213 filed Mar. 1, 2002.

The present invention is, of course, in no way restricted to the specific disclosure of the specification and drawings, but also encompasses any modifications within the scope of the appended claims.

The invention claimed is:

1. An apparatus for joining together substrates, which have an inner hole, to form a substrate disk, comprising:

an expandable element that is introducible into an inner hole of at least two superimposed substrates, wherein said expandable element is expandable to such an extent that it can come into contact with said inner holes of both of said substrates to close off an intermediate space formed between said substrates relative to the environment;

a substrate support that is rotatable about an axis of rotation perpendicular to a support surface thereof;

a centering means that is rotatably coupled with said substrate support and is movable relative thereto in the direction of said axis of rotation, wherein said expandable element is disposed, and is compressible, between said substrate support and said centering means.

2. An apparatus according to claim 1, wherein said expandable element is made of an elastic material.

3. An apparatus according to claim 1, wherein said expandable element is expandable by means of application of pressure.

4. An apparatus according to claim 1, wherein said expandable element is an elastic ring.

5. An apparatus according to claim 4, wherein at least one of the components of the apparatus has a conically widening portion that, for expansion of said ring, is introducible into a central hole of said ring.

6. An apparatus according to claim 4, wherein said centering means is a centering pin that extends through a central hole of said ring.

7. An apparatus according to claim 1, wherein said expandable element 140, 240 has an elastic chamber that can be supplied with pressure.

8. An apparatus according to claim 7, wherein a wall of said chamber has a smaller outer periphery than does an inner periphery of said inner hole of said substrates when said chamber is at ambient pressure.

9. An apparatus according to claim 7, wherein a wall of said chamber has a larger outer periphery than does an inner periphery of said inner hole of said substrates when said chamber is at ambient pressure.

10. An apparatus according to claim 1, wherein said expandable element is fixedly connected to said rotatable substrate support.

* * * * *

UNITED STATES PATENT AND TRADEMARK OFFICE
CERTIFICATE OF CORRECTION

PATENT NO. : 7,182,116 B2 Page 1 of 1
APPLICATION NO. : 10/472676
DATED : February 27, 2007
INVENTOR(S) : Hupp et al.

It is certified that error appears in the above-identified patent and that said Letters Patent is hereby corrected as shown below:

<u>Title page, and Col. 1, Line 1</u>
Item [54] should read as follows:

[54] Title: APPARATUS FOR JOINING SUBSTRATES TOGETHER

Signed and Sealed this

Seventeenth Day of April, 2007

JON W. DUDAS
*Director of the United States Patent and Trademark Office*